United States Patent
Munari

(10) Patent No.: US 10,842,326 B2
(45) Date of Patent: Nov. 24, 2020

(54) HANDLE FOR A KITCHEN CONTAINER AND RELATIVE SYSTEM FOR FASTENING TO SUCH A KITCHEN CONTAINER

(71) Applicant: LA TERMOPLASTIC F.B.M. S.r.L., Arsago Seprio (IT)

(72) Inventor: Marco Munari, Cardano al Campo (IT)

(73) Assignee: LA TERMOPLASTIC F.B.M. S.R.L., Arsago Seprio (IT)

( * ) Notice: Subject to any disclaimer, the term of this patent is extended or adjusted under 35 U.S.C. 154(b) by 621 days.

(21) Appl. No.: 15/626,298

(22) Filed: Jun. 19, 2017

(65) Prior Publication Data
US 2017/0360260 A1 Dec. 21, 2017

(30) Foreign Application Priority Data

Jun. 20, 2016 (IT) .................. 102016000063377

(51) Int. Cl.
*A47J 45/06* (2006.01)
*F16B 19/04* (2006.01)

(52) U.S. Cl.
CPC ............. *A47J 45/061* (2013.01); *A47J 45/06* (2013.01); *F16B 19/04* (2013.01)

(58) Field of Classification Search
CPC ........ A47J 45/061; A47J 45/06; A47J 45/066; A47J 2201/00; F16B 19/04; F16B 21/08;
(Continued)

(56) References Cited

U.S. PATENT DOCUMENTS 1,965,354 A * 7/1934 Patock .................... A47J 45/10
16/421
2,133,252 A * 10/1938 Moore .................. A47J 45/071
16/430
(Continued)

FOREIGN PATENT DOCUMENTS

AU 417138 9/1971
DE 7435913 2/1975
(Continued)

OTHER PUBLICATIONS

English Machine Translation of DE102007054022A1 dated May 14, 2009.

*Primary Examiner* — Matthew R McMahon
(74) *Attorney, Agent, or Firm* — King & Schickli, PLLC

(57) ABSTRACT

The invention describes a system for fastening a handle to a kitchen container that comprises a plate-like fastening element, configured for being irremovably constrained both to a wall of the kitchen container, and to the handle. The plate-like fastening element is configured to be housed and restrained in a corresponding blind hole obtained at an end of the handle. The plate-like fastening element comprises at least one inclined hooking wing, integral with the plate and projecting below one of its surfaces. Each inclined hooking wing is configured for inserting, through elastic deformation while switching from the disassembled configuration to the assembled configuration of the fastening system, into at least one corresponding concave portion obtained on an inner surface of the blind hole towards which each inclined hooking wing projects in the assembled configuration of the fastening system.

14 Claims, 6 Drawing Sheets

(58) Field of Classification Search
CPC ....... F16B 1/02; B65D 25/28; B65D 25/2802; B65D 25/2805; B65D 25/2808; B65D 25/282
USPC .............. 403/361; 312/326–329, 348.6, 405; 220/753, 755, 759
See application file for complete search history.

(56) References Cited

U.S. PATENT DOCUMENTS

| | | | | |
|---|---|---|---|---|
| 2,246,393 | A | * | 6/1941 | Sperry .................... A47J 45/08 220/752 |
| 2,494,159 | A | * | 1/1950 | Bernstein .............. A47J 45/071 220/759 |
| 3,883,169 | A | * | 5/1975 | Fischbach .............. A47J 45/071 294/31.1 |
| 3,967,351 | A | * | 7/1976 | Rosenberg ........... A44C 5/2047 24/616 |
| 4,761,851 | A | * | 8/1988 | Day ...................... A47J 45/071 220/752 |
| 4,782,555 | A | * | 11/1988 | Fischbach ............. A47J 45/071 16/DIG. 24 |
| 5,010,615 | A | * | 4/1991 | Carter ..................... A47L 13/17 15/104.94 |
| 5,775,553 | A | * | 7/1998 | Marshall ............ A47G 25/1421 223/85 |
| 7,841,486 | B2 | * | 11/2010 | Munari ................. A47J 45/061 220/776 |
| 7,988,209 | B2 | * | 8/2011 | Hudson ................ G09F 3/0305 24/700 |

FOREIGN PATENT DOCUMENTS

| | | | | |
|---|---|---|---|---|
| DE | 102007054022 A1 | | 5/2009 | |
| FR | 2109283 A5 | * | 5/1972 | .............. A47J 45/02 |
| GB | 2183196 | | 6/1987 | |
| GB | 2347641 | | 9/2000 | |
| WO | WO-03059136 A1 | * | 7/2003 | ................ B25G 3/26 |
| WO | WO-2013160854 A1 | * | 10/2013 | ............ A47J 45/071 |

* cited by examiner

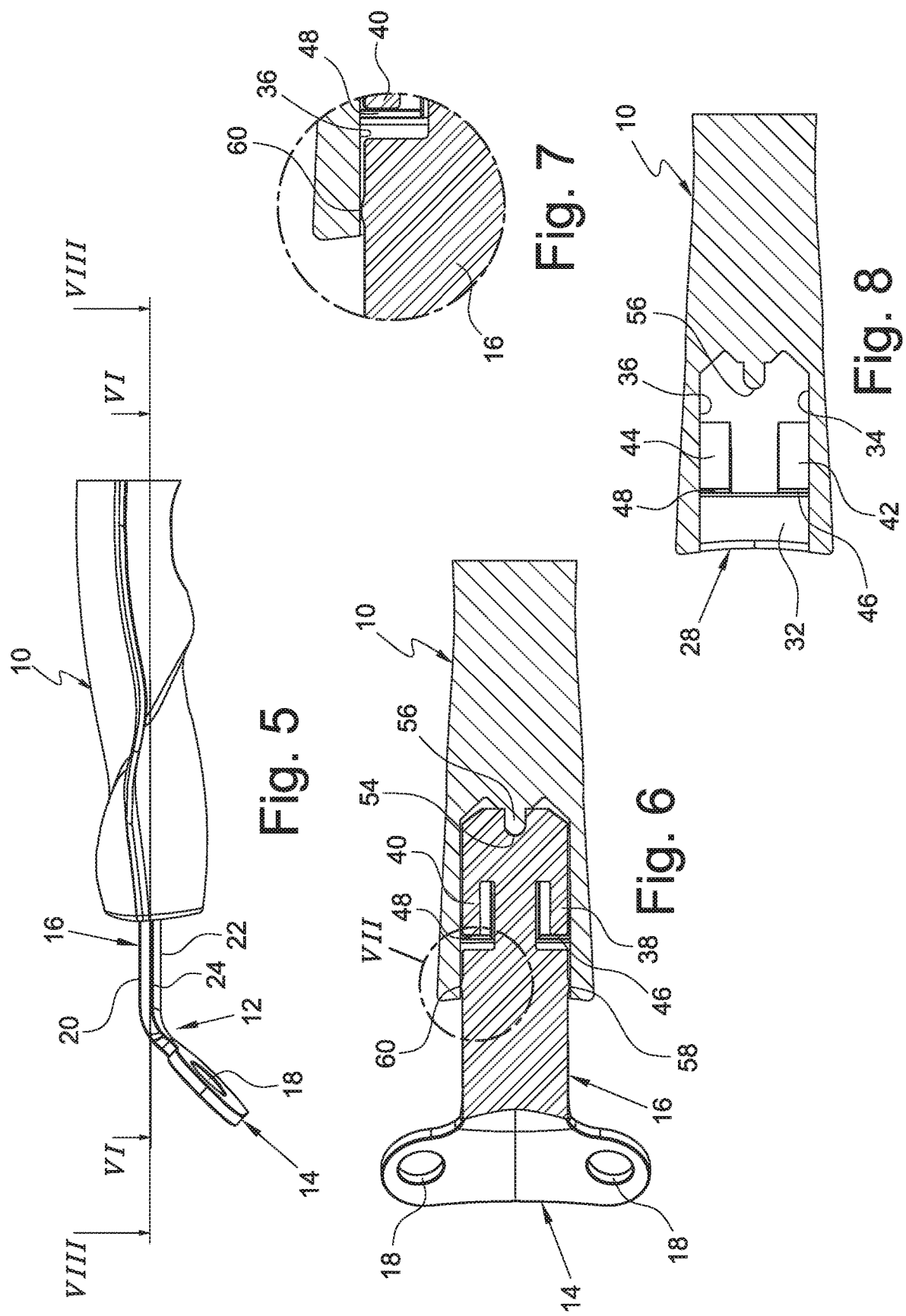

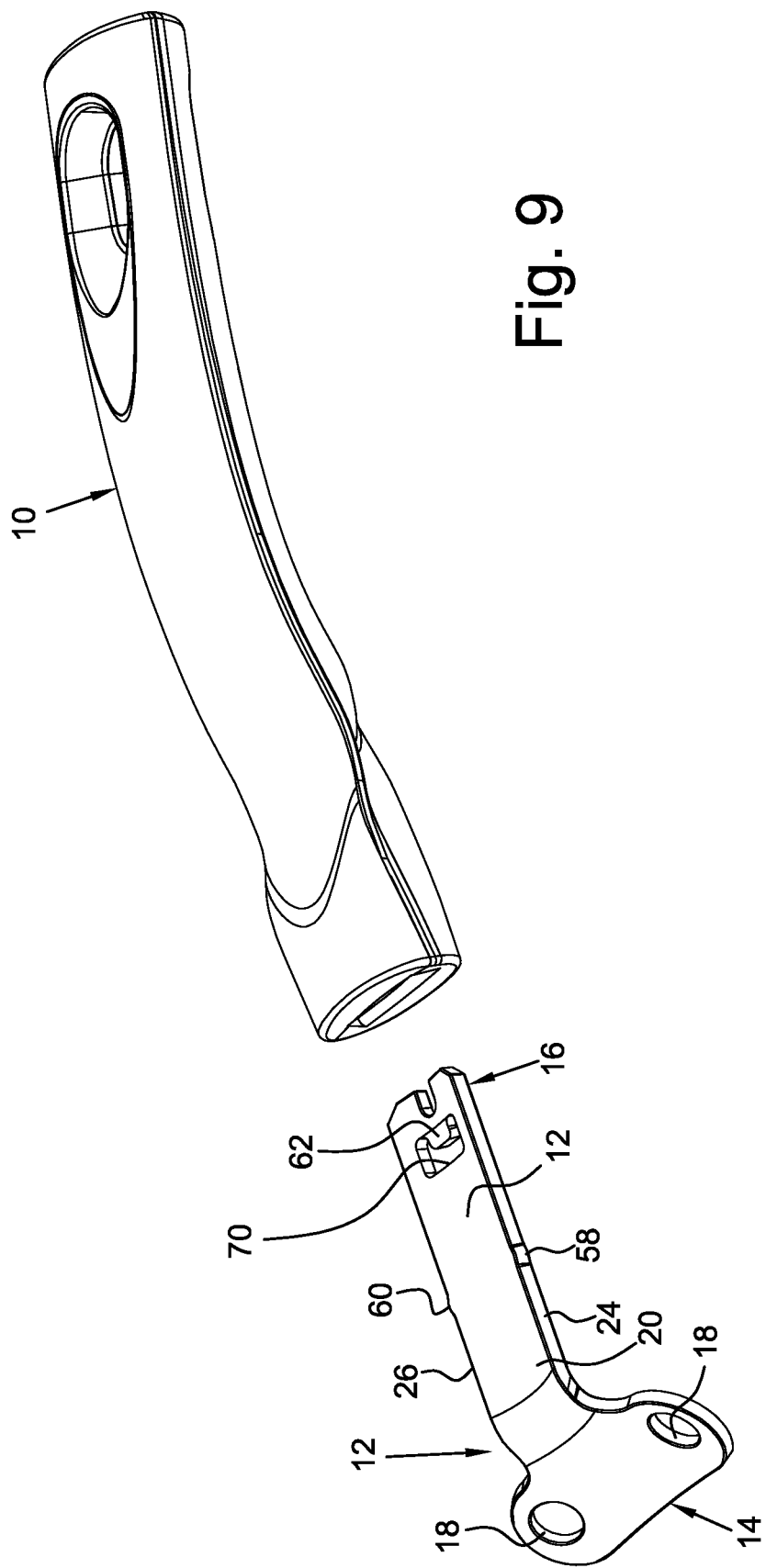

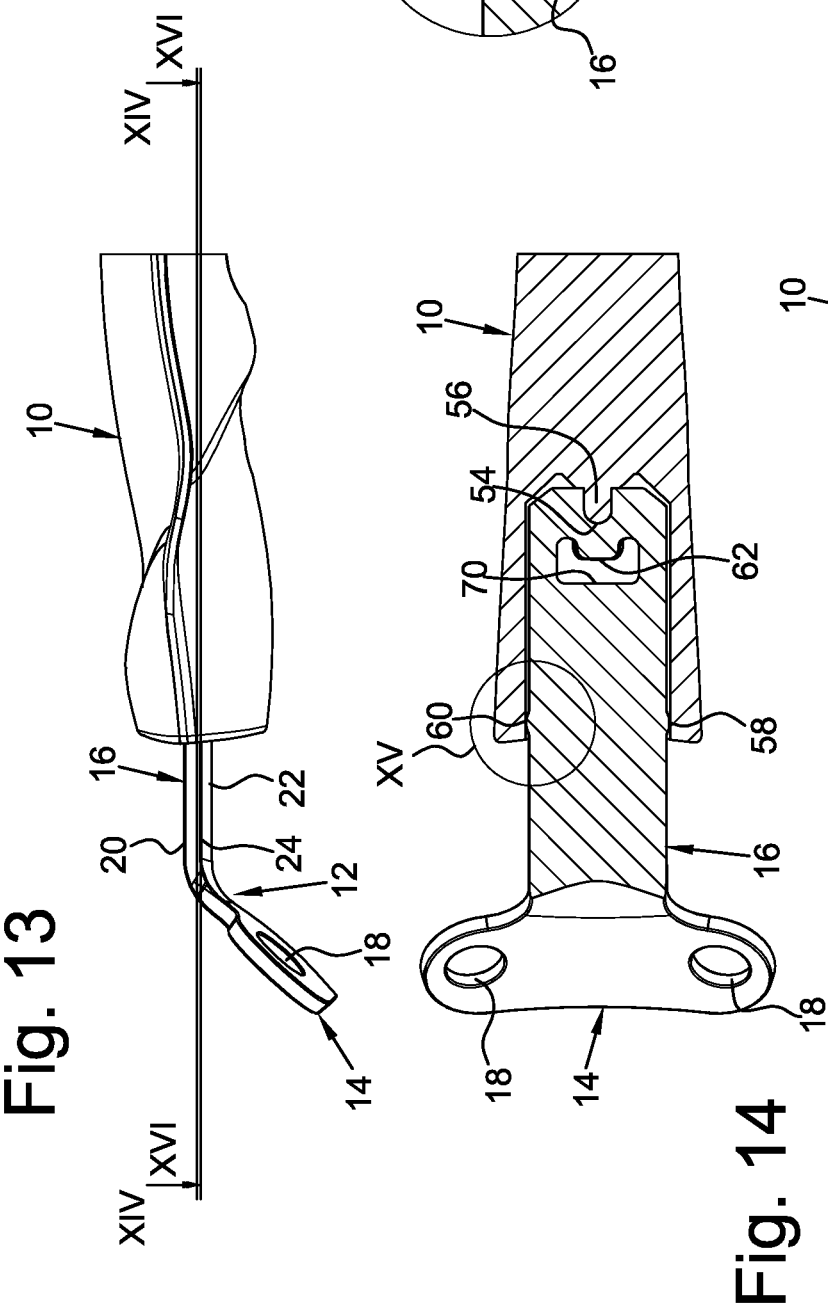

HANDLE FOR A KITCHEN CONTAINER AND RELATIVE SYSTEM FOR FASTENING TO SUCH A KITCHEN CONTAINER

This application claims the benefit of Italian Patent Application Ser. No. 102016000063377, filed Jun. 20, 2016, the disclosure of which is incorporated herein by reference.

The present invention refers in general to a handle for a kitchen container and, more specifically, to a system for fastening such a handle to the relative kitchen container.

As known, the most common containers intended for cooking food in general, like for example frying pans, saucepans and cooking pots, are provided with handles or grips that allow them to be easily held, even when the container is full and it is hot. In particular, frying pans are normally provided with a single elongated handle, which can be manufactured with a thermosetting and/or thermoplastic and/or silicone material and which extends radially canti-levered from the lateral wall of the pan. The handle is usually constrained to a fastening element shaped like a plate or bridge, in turn permanently fixed to the lateral wall of the pan through welding or rivets.

The irreversible connection between the handle and the relative fastening element is normally carried out in the factory. A first type of irreversible connection foresees that the handle is fixedly connected to the fastening element through overmoulding. As known, overmoulding or "insert moulding" is a technique that foresees the melting of a thermoplastic material, which in this case will constitute the handle, injected into a mould that carries one or more pre-formed inserts inside it, in this case consisting of the fastening element. The step of injecting the thermoplastic material into the mould takes place at particularly high temperatures and pressures. When the thermoplastic material cools, it consequently tends to contract. The contraction of the plastic thus causes the winding of the insert or of the inserts, considerably increasing the force exerted in the bond between the two respective materials. The overmoulding technique is therefore a refined and expensive technique, which requires the use of sophisticated machinery and substantial expertise.

Another type of irreversible connection foresees the insertion of the fastening element in a corresponding cavity obtained on an end of the handle. This operation is carried out cold. The handle is thus fixedly connected to the fastening element through screws or rivets. A drawback of the connection through screws consists of the fact that the screw, after prolonged use of the kitchen container and of the relative handle, as well as after frequent washes, loosens and makes the handle itself unstable. Therefore, it becomes necessary to periodically tighten the screw, which with the passing of time can compromise the functionality of the handle. In addition, both the screws, and the rivets can be subject to breaking, causing the detachment of the handle from the relative fastening element.

A further type of irreversible connection foresees that the handle is fixedly connected to the fastening element through gluing. It is therefore required to use special very strong adhesives to prevent prolonged use of the kitchen container, as well as the consequent washing at high temperatures, from causing the detachment of the handle from the respective fastening element.

In the state of the art there are also connection systems between the handle and the relative fastening element that are provided with elastic connection elements. These elastic elements normally consist of separate components both with respect to the handle, and with respect to the relative fastening element. In addition, these elastic elements are typically intended for use on kitchen containers with dismountable/extractable handles and are therefore configured to make a removable connection between the handle and the relative fastening element. The elastic force exerted by these connection elements is therefore not particularly high, having to be counteracted by a user whenever it is wished to mount or dismount the handle with respect to the kitchen container. Connection systems between the handle and the relative fastening element that are provided with elastic connection elements are described, for example, in documents GB 2347641 A, GB 2183196 A, DE 7435913 U and AU 417138 B2.

The purpose of the present invention is therefore that of making a handle for a kitchen container, in particular a system for fastening such a handle to the relative kitchen container, which is capable of solving the aforementioned drawbacks of the prior art in an extremely simple, cost-effective and particularly functional manner.

In detail, a purpose of the present invention is to make a system for fastening a handle to a kitchen container that allows quick and easy assembly in the factory, without needing to use complex and expensive machinery.

Another purpose of the present invention is to make a system for fastening a handle to a kitchen container that allows the stability of the handle to be improved with respect to conventional connection systems, even in the absence of screws, rivets or other fastening means.

A further purpose of the present invention is to make a system for fastening a handle to a kitchen container that allows stable and long-lasting fastening, using a minimum number of components, in particular a single component.

These purposes according to the present invention are achieved by making a handle for a kitchen container, in particular a system for fastening such a handle to the relative kitchen container, as outlined in claim 1.

Further characteristics of the invention are highlighted by the dependent claims, which are an integral part of the present description.

The characteristics and advantages of a system for fastening a handle to a kitchen container according to the present invention will become clearer from the following description, given as an example and not for limiting purposes, referring to the attached schematic drawings, in which:

FIG. 5 is a side elevational view of the fastening system of FIG. 1, shown in assembled configuration;

FIG. 6 is a section view obtained along the line VI-VI of FIG. 5;

FIG. 7 is a detailed view of the detail indicated with VII in FIG. 6;

FIG. 8 is a section view obtained along the line VIII-VIII of FIG. 5;

FIG. 9 is an exploded perspective view of a second embodiment of the system for fastening a handle to a kitchen container according to the present invention, shown in pre-assembly configuration;

FIG. 13 is a side elevational view of the fastening system of FIG. 9, shown in assembled configuration;

FIG. 14 is a section view obtained along the line XIV-XIV of FIG. 13;

FIG. 15 is a detailed view of the detail indicated with XV in FIG. 14; and

FIG. 16 is a section view obtained along the line XVI-XVI of FIG. 13.

Figure 1:
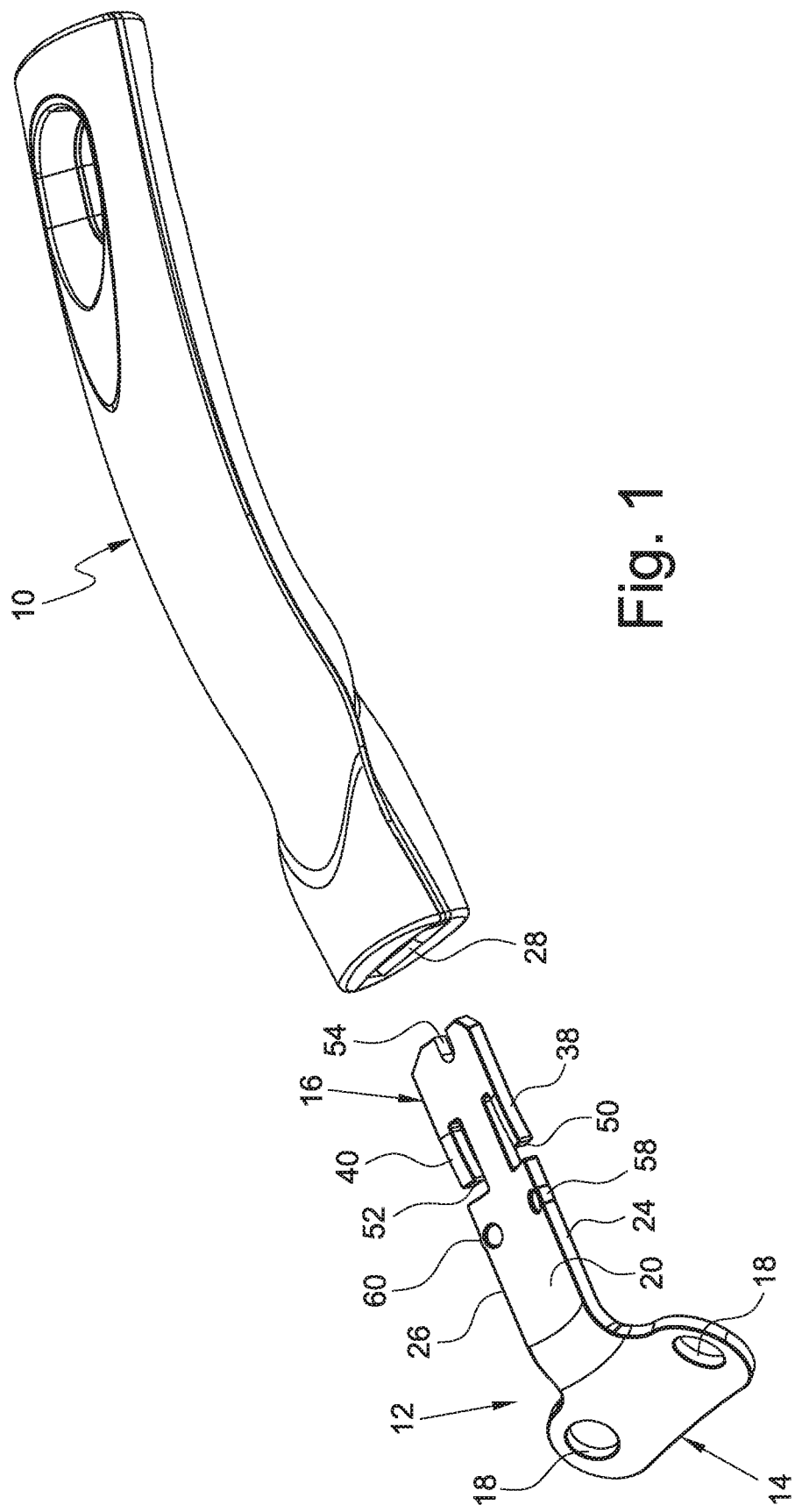
FIG. 1 is an exploded perspective view of a first embodiment of the system for fastening a handle to a kitchen container according to the present invention, shown in pre-assembly configuration.
Figure 2:
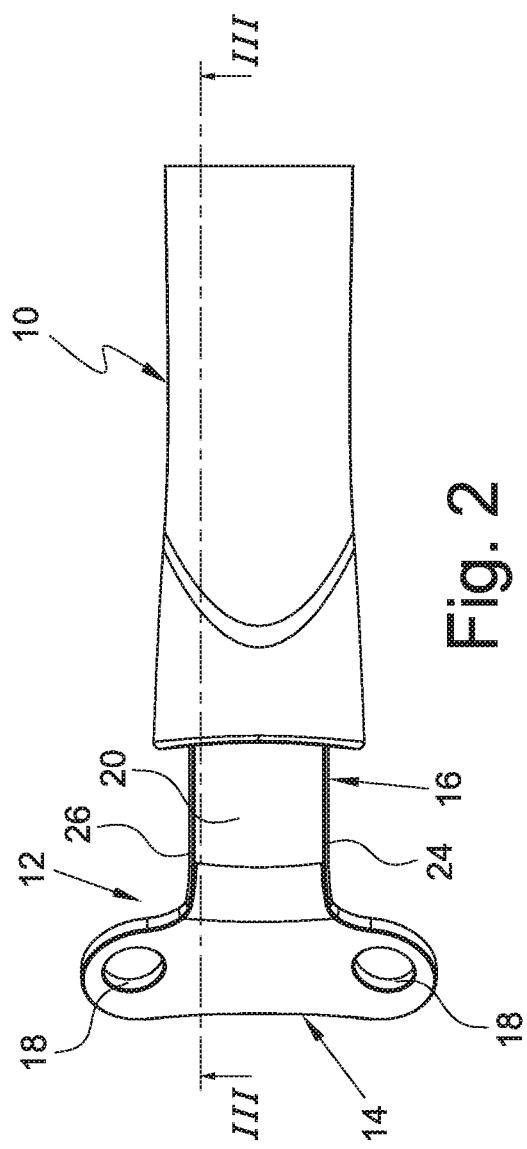
FIG. 2 is a plan view from above of the fastening system of FIG. 1, shown in assembled configuration.

With reference to the figures, two preferred embodiments of the system for fastening a handle 10 to a kitchen container (not shown) according to the present invention are shown. The handle 10 can be shaped in any way, but it more frequently consists of a handle having an arched and elongated shape to allow the kitchen container to be easily gripped, especially when the latter consists of a frying pan of considerable diameter and when the handle 10 is its only gripping means. In another embodiment, not shown in the figures, the handle could on the other hand consist of a grip that is mounted in pairs on specific kitchen containers, in turn consisting of cooking pots or pans. The handle 10 is advantageously manufactured with a thermosetting and/or thermoplastic material, or silicone, suitable for use inside any type of dishwasher.

The system comprises a plate-like fastening element 12, provided with a first portion 14, configured for being irremovably constrained to a wall of the kitchen container, and with a second portion 16, configured for being irremovably constrained to the handle 10. The plate-like fastening element 12 advantageously consists of a single component manufactured with a metal material.

In detail, the first portion 14 of the plate-like fastening element 12 can be arc-shaped, so as to perfectly adhere to a corresponding arc-shaped lateral surface of the kitchen container. On the first portion 14 of the plate-like fastening element 12 it is thus possible to obtain one or more through-holes 18, configured for performing the connection of such a plate-like fastening element 12 to the kitchen container through respective rivets.

The second portion 16 of the plate-like fastening element 12 consists of a plate having an upper surface 20, a lower surface 22 and two corresponding lateral edges 24 and 26. The plate 16 is configured for being housed and restrained within a corresponding blind hole 28 obtained at an end of the handle 10, i.e. the end of the handle 10 intended for the coupling with the plate-like fastening element 12. Consequently, the blind hole 28 is in turn internally provided with a respective upper surface 30, a respective lower surface 32 and two respective lateral edges 34 and 36, configured for adhering to the corresponding upper surface 20, lower surface 22 and lateral edges 24 and 26 of the plate 16 in the assembled configuration of the fastening system.

Preferably, as shown in the figures, the upper surface 20 of the plate 16 has a concave shape and the lower surface 22 of such a plate 16 has a convex shape. Consequently, the upper surface 30 of the blind hole 28 has a concave shape and the lower surface 32 of such a blind hole 28 has a convex shape. However, this does not rule out the possibility that the upper surfaces 20 and 30 and the lower surfaces 22 and 32 of the plate 16 and of the blind hole, respectively, can have different shapes, while still maintaining mutually compatible shapes, as well as the plate-like configuration of the fastening element 12.

The plate-like fastening element 12 comprises at least one inclined hooking wing 38, 40, 62, integral with the plate 16 and projecting below one of the upper surface 20 and the lower surface 22 of such a plate 16. This at least one inclined hooking wing 38, 40, 62 is configured for inserting, through elastic deformation while switching from the disassembled configuration (FIGS. 1 and 9) to the assembled configuration (FIGS. 2-8 and 10-16) of the fastening system, in at least one corresponding concave portion or tray 42, 44, 64 obtained on one from the upper surface 30 and the lower surface 32 of the blind hole 28, i.e. the inner surface of such a blind hole 28 towards which such at least one inclined hooking wing 38, 40, 62 projects in the assembled configuration of the fastening system (see for example FIGS. 3-4 and 11-12).

Each concave portion or tray 42, 44, 64 is provided with a respective abutment wall 46, 48, 66, configured for restraining a corresponding terminal end 50, 52, 68 of each inclined hooking wing 38, 40, 62 in the assembled configuration of the fastening system, thus preventing the accidental exit of the plate-like fastening element 12 from the blind hole 28 of the handle 10. It is therefore possible to carry out cold mounting, by interference, of the handle 10 on the respective plate-like fastening element 12. This mounting is irreversible and can take place manually, i.e. without needing to use particular machinery, even when the plate-like fastening element 12 has already been fixedly connected to the kitchen container.

In the embodiment shown in FIGS. 1-8, the plate-like fastening element 12 comprises two opposite inclined hooking wings 38 and 40, obtained at the two lateral edges 24 and 26 of the plate 16. The two opposite inclined hooking wings 38 and 40 extend parallel to one another, along a direction substantially parallel to the direction of extension of the plate 16, and project downwards, i.e. below the lower surface 22 of the plate 16. The two corresponding terminal ends 50 and 52 of each inclined hooking wing 38 and 40 thus face towards the first portion 14 of the plate-like fastening element 12.

Figure 4:
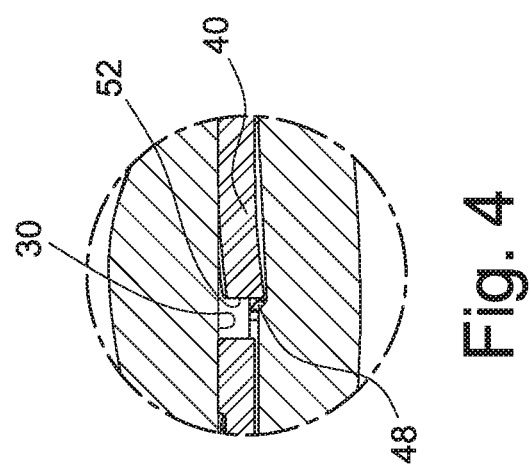
FIG. 4 is a detailed view of the detail indicated with IV in FIG. 3.
Figure 3:
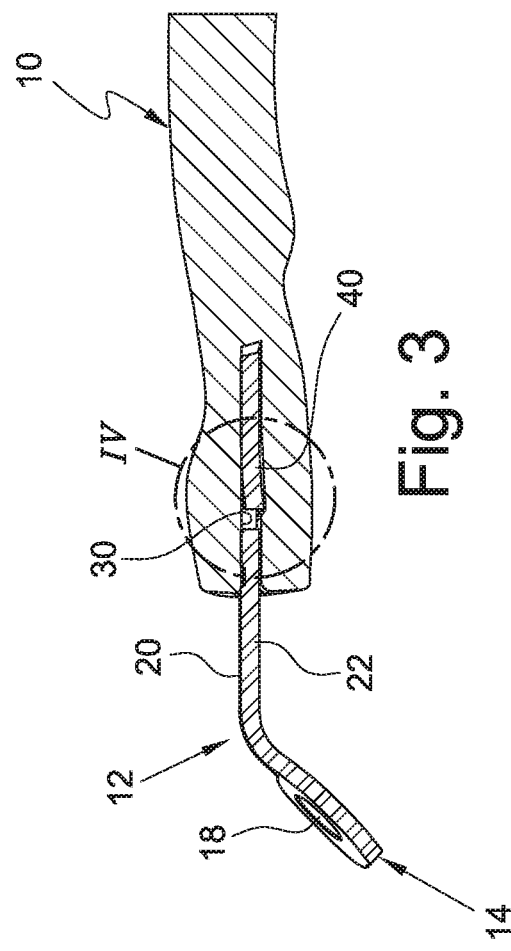
FIG. 3 is a section view obtained along the line III-III of FIG. 2.

Consequently, the blind hole 28 comprises two corresponding concave portions or trays 42 and 44, obtained on the lower surface 32 of the blind hole 28, i.e. the surface towards which the two inclined hooking wings 38 and 40 project. As shown in the enlargement of FIG. 4, the abutment walls 46 and 48 of each concave portion or tray 42 and 44 decrease downwards from the opening of the blind hole 28 and in the direction of the bottom of such a blind hole 28. The orientation of this inclination of the abutment walls 46 and 48 allows easy insertion of the plate 16 into the blind hole 28 in the assembly step of the fastening system, at the same time preventing the detachment of the plate-like fastening element 12 from the handle 10 (which should occur in the opposite direction to that of insertion) once the fastening system has been assembled.

In the embodiment shown in FIGS. 9-16, the plate-like fastening element 12, on the other hand, comprises a single inclined hooking wing 62, obtained inside a window 70 arranged at the median axis of the plate 16. The single inclined hooking wing 62 extends along a direction substantially parallel to the direction of extension of the plate 16 and projects downwards, i.e. below the lower surface 22 of the plate 16. The terminal end 68 of the single inclined hooking wing 62 thus faces towards the first portion 14 of the plate-like fastening element 12.

Figure 12:
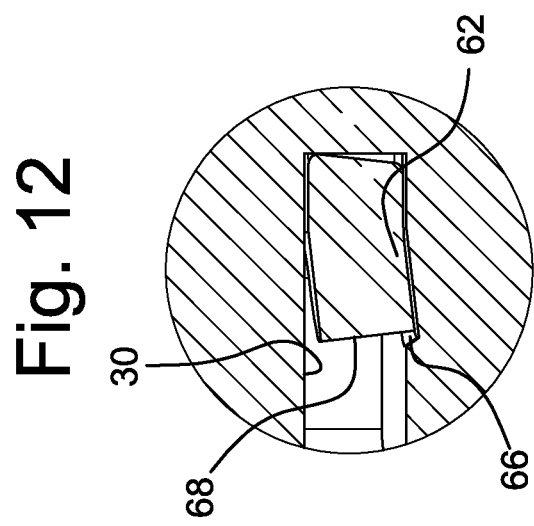
FIG. 12 is a detailed view of the detail indicated with XII in FIG. 11.
Figure 11:
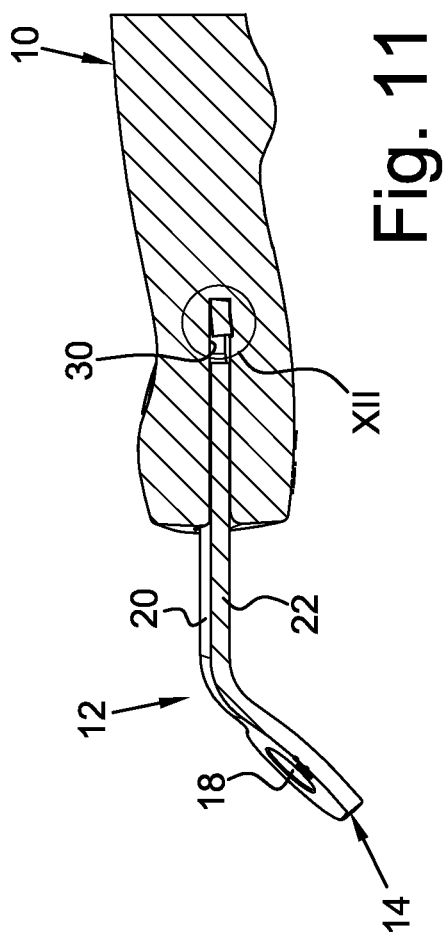
FIG. 11 is a section view obtained along the line XI-XI of FIG. 10.
Figure 10:
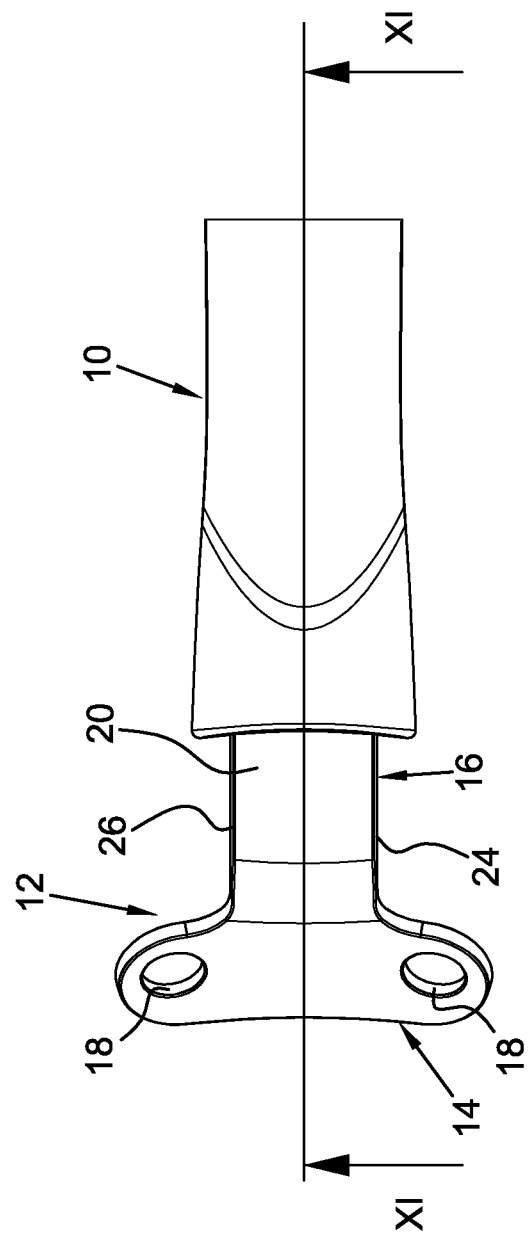
FIG. 10 is a plan view from above of the fastening system of FIG. 9, shown in assembled configuration.

Consequently, the blind hole 28 comprises a corresponding single concave portion or tray 64, obtained on the lower surface 32 of the blind hole 28, i.e. the surface towards which the single inclined hooking wing 62 projects. As shown in the enlargement of FIG. 12, the abutment wall 66 of the single concave portion or tray 64 decreases downwards from the opening of the blind hole 28 and in the direction of the bottom of such a blind hole 28. The orientation of this inclination of the abutment wall 66 allows easy insertion of the plate 16 into the blind hole 28 in the assembly step of the fastening system, at the same time preventing the detachment of the plate-like fastening element 12 from the handle 10 (which should occur in the opposite direction to that of insertion) once the fastening system has been assembled. In addition, the presence of a single inclined hooking wing 62, obtained inside a window 70 arranged at the median axis of the plate 16, gives the handle 10 and the relative plate-like fastening element 12 a better resistance to loads and fatigue.

On the terminal end of the plate 16, i.e. the opposite end of the plate 16 with respect to the first portion 14 of the plate-like fastening element 12, at least one protrusion or a notch 54 are obtained, which are configured for inserting in a shape-coupling manner with a corresponding notch or protrusion 56 obtained on the bottom of the blind hole 28. The mutual interaction between these notches and/or protrusions 54 and 56 makes it possible to carry out the centring of the plate 16 in its assembly step inside the blind hole 28 of the handle 10.

Preferably, as shown in the figures, on the terminal end of the plate 16 there is a single notch 54, obtained at the median axis of such a plate 16. Consequently, on the bottom of the blind hole 28 there is a single protrusion 56, obtained on the centreline of such a bottom and configured for inserting into the aforementioned single notch 54.

On each lateral edge 24 and 26 of the plate 16 it is finally possible to obtain at least one swelling 58 and 60, configured for abutting against the corresponding lateral edge 34 and 36 of the blind hole 28. The function of the swellings 58 and 60 is that of eliminating possible lateral clearances of the plate 16 inside the blind hole 28 in the assembled configuration of the fastening system.

It has thus been seen that the system for fastening a handle to a kitchen container according to the present invention achieves the purposes highlighted earlier. The assembly of the handle can be carried out manually or with the help of small presses, the fastening load being of the order of a few tens of kilograms.

The assembly consisting of the inclined hooking wings, with the relative concave portions or trays, the centring notch, with the relative protrusion, and the abutment swellings makes it possible to form up to five constraint points that allow a stable and long-lasting fastening of the handle to the relative plate-like fastening element, without requiring screws, rivets or various adhesives. Moreover, the fact that all of the components of the fastening element are formed in a single piece with the fastening element itself makes the fastening system cost-effective and simple to manufacture.

The system for fastening a handle to a kitchen container of the present invention thus conceived can in any case undergo numerous modifications and variants, all of which are covered by the same inventive concept; moreover, all of the details can be replaced by technically equivalent elements. In practice, the materials used, as well as the shapes and sizes, can be whatever according to the technical requirements.

The scope of protection of the invention is therefore defined by the attached claims.

The invention claimed is:

1. System for fastening to a kitchen container, the system comprising a handle (10), a plate-like fastening element (12) provided with a first portion (14) configured for being irremovably constrained to a wall of the kitchen container, and with a second portion (16) configured for being irremovably constrained to the handle, wherein said second portion (16) consists of a plate having an upper face (20), a lower face (22) and two opposing lateral faces (24, 26), wherein said plate (16) is configured for being housed and restrained within a corresponding blind hole (28) obtained at one end of the handle (10), the end of the handle (10) intended for the coupling with the plate-like fastening element (12), and wherein the blind hole (28) is in turn internally defined by a bottom face, an upper face (30), a lower face (32) and two opposing lateral faces (34, 36), wherein in an assembled configuration of the fastening system, said upper face (30), said lower face (32) and said two opposing lateral faces (34, 36) of said blind hole (28) adhere respectively to the corresponding upper face (20), lower face (22) and lateral faces (24, 26) of the plate (16), wherein the plate-like fastening element (12) comprises at least one inclined hooking wing (38, 40; 62) integral with the plate (16) and projecting from one of the upper face (20) and the lower face (22) of said plate (16), the system being characterized in that said at least one inclined hooking wing (38, 40; 62) is configured for inserting, through elastic deformation while switching from a disassembled configuration to the assembled configuration of the fastening system, into at least one corresponding concave portion (42, 44; 64) obtained on one of the upper face (30) and the lower face (32) of the blind hole (28), the face of said blind hole (28) towards which said at least one inclined hooking wing (38, 40; 62) projects in the assembled configuration of the fastening system, wherein each concave portion (42, 44; 64) is provided with a respective abutment wall (46, 48; 66) configured for restraining a corresponding terminal end (50, 52; 68) of each inclined hooking wing (38, 40; 62) in the assembled configuration of the fastening system, thus preventing the accidental exit of the plate-like fastening element (12) from the blind hole (28) and obtaining an irreversible mounting of said plate-like fastening element (12) into said handle (10), and wherein each inclined hooking wing (38, 40; 62) extends along a direction substantially parallel to a development direction of the plate (16) and projects downwards below the lower face (22) of the plate (16).

2. System according to claim 1, characterized in that the plate-like fastening element (12) comprises two opposite inclined hooking wings (38, 40) obtained at the two lateral edges (24, 26) of the plate (16).

3. System according to claim 2, characterized in that the two corresponding terminal ends (50, 52) of each of said two inclined hooking wings (38, 40) face towards the first portion (14) of the plate-like fastening element (12).

4. System according to claim 3, characterized in that the blind hole (28) comprises two corresponding concave portions (42, 44) obtained on the lower surface (32) of said blind hole (28) the surface towards which said two inclined hooking wings (38, 40) project, the abutment walls (46, 48) of each of said two concave portions (42, 44) decreasing downwards starting from the opening of the blind hole (28) and in the direction of the bottom of said blind hole (28), the inclination orientation of said abutment walls (46, 48) allowing an insertion of the plate (16) into the blind hole (28) in an assembling step of the fastening system, at the same time preventing the detachment of the plate-like fastening element (12) from the handle (10) once the fastening system has been assembled.

5. System according to claim 1, characterized in that the plate-like fastening element (12) comprises a single inclined hooking wing (62), obtained inside a window (70) arranged at the median axis of the plate (16).

6. System according to claim 5, characterized in that the terminal end (68) of said single inclined hooking wing (62) faces towards the first portion (14) of the plate-like fastening element (12).

7. System according to claim 6, characterized in that the blind hole (28) comprises a single corresponding concave portion (64), obtained on the lower surface (32) of said blind hole (28), the surface towards which the single inclined hooking wing (62) projects, the abutment wall (66) of said single concave portion (64) decreasing downwards from the opening of the blind hole (28) and in the direction of the bottom of such a blind hole (28), the orientation of the inclination of said abutment wall (66) allowing insertion of the plate (16) into the blind hole (28) in an assembly step of the fastening system, at the same time preventing the detachment of the plate-like fastening element (12) from the handle (10) once the fastening system has been assembled.

8. System according to claim 1, characterized in that on the terminal end of the plate (16), the end of the plate (16) opposite with respect to the first portion (14) of the plate-like fastening element (12), at least one protrusion or a notch (54) are obtained, which are configured for inserting in a shape-coupling manner with a corresponding notch or protrusion (56) obtained on the bottom of the blind hole (28), the mutual interaction between said notches and/or protrusions (54, 56) carrying out the centering of the plate (16) in its assembling step inside the blind hole (28).

9. System according to claim 8, characterized in that on the terminal end of the plate (16) a single notch (54) is provided, which is obtained at the median axis of said plate (16), and in that on the bottom of the blind hole (28) a single protrusion (56) is provided, which is obtained on the centreline of said bottom and configured for inserting into said single notch (54).

10. System according to claim 1, characterized in that on each lateral edge (24, 26) of the plate (16) at least one swelling (58, 60) is obtained, which is configured for abutting against the corresponding lateral edge (34, 36) of the blind hole (28), said at least one swelling (58, 60) eliminating possible lateral clearances of the plate (16) inside the blind hole (28) in the assembled configuration of the fastening system.

11. System according to claim 1, characterized in that the plate-like fastening element (12) consists of a single component made of a metal material.

12. System according to claim 1, characterized in that the first portion (14) of the plate-like fastening element (12) is arc-shaped, so as to adhere to a corresponding arc-shaped lateral surface of the kitchen container.

13. System according to claim 1, characterized in that on the first portion (14) of the plate-like fastening element (12) one or more through-holes (18) are obtained, which are configured for performing the connection of said plate-like fastening element (12) with the kitchen container by means of respective rivets.

14. System according to claim 1, characterized in that the upper surface (20) of the plate (16) has a concave shape, the lower surface (22) of said plate (16) has a convex shape, the upper surface (30) of the blind hole (28) has a concave shape and the lower surface (32) of said blind hole (28) has a convex shape.

* * * * *